(12) United States Patent
Birk

(10) Patent No.: US 11,940,807 B2
(45) Date of Patent: Mar. 26, 2024

(54) METHOD FOR CONTROLLING A UTILITY VEHICLE

(71) Applicant: ZF Friedrichshafen AG, Friedrichshafen (DE)

(72) Inventor: Markus Birk, Friedrichshafen (DE)

(73) Assignee: ZF FRIEDRICHSHAFEN AG, Friedrichshafen (DE)

(*) Notice: Subject to any disclaimer, the term of this patent is extended or adjusted under 35 U.S.C. 154(b) by 380 days.

(21) Appl. No.: 17/431,177

(22) PCT Filed: Jan. 14, 2020

(86) PCT No.: PCT/EP2020/050788
§ 371 (c)(1),
(2) Date: Aug. 16, 2021

(87) PCT Pub. No.: WO2020/169272
PCT Pub. Date: Aug. 27, 2020

(65) Prior Publication Data
US 2022/0147054 A1 May 12, 2022

(30) Foreign Application Priority Data
Feb. 19, 2019 (DE) ............ 10 2019 202 182.4

(51) Int. Cl.
*G05D 1/02* (2020.01)
*G05D 1/00* (2006.01)

(52) U.S. Cl.
CPC ......... *G05D 1/0274* (2013.01); *G05D 1/0223* (2013.01); *G05D 1/024* (2013.01); *G05D 1/0257* (2013.01)

(58) Field of Classification Search
CPC .... G05D 1/0274; G05D 1/0223; G05D 1/024; G05D 1/0257; G05D 2201/0201; A01B 67/00; A01B 69/001; G01S 13/89; G01S 13/931; G01S 17/89; G01S 17/931
See application file for complete search history.

(56) References Cited

U.S. PATENT DOCUMENTS

| 5,558,163 A * | 9/1996 | Hollstein | ............ A01B 71/02 172/4 |
| 10,030,996 B2 * | 7/2018 | Vath | ............ G01D 5/26 |
| 10,539,963 B2 | 1/2020 | Adomat et al. | |

(Continued)

FOREIGN PATENT DOCUMENTS

| DE | 102013008828 A1 | 11/2014 |
| DE | 102014226439 A1 | 6/2016 |

(Continued)

*Primary Examiner* — Mussa A Shaawat
(74) *Attorney, Agent, or Firm* — LEYDIG, VOIT & MAYER, LTD.

(57) ABSTRACT

A method for controlling a utility vehicle includes detecting, via a sensor, an elevation profile of a region located in front of the utility vehicle in the direction of travel. The method also includes initializing a grid comprising a plurality of grid cells. The grid extends at least in a longitudinal direction and in a vertical direction of the region. The method further includes assigning the detected elevation profile to associated grid cells by writing elevation profile data into grid cells and controlling the vehicle based on the elevation profile data.

19 Claims, 1 Drawing Sheet

(56) References Cited

U.S. PATENT DOCUMENTS

| | | | | |
|---|---|---|---|---|
| 2007/0193798 A1* | 8/2007 | Allard | ............... | B62D 1/286 |
| | | | | 180/169 |
| 2010/0312428 A1* | 12/2010 | Roberge | ............... | A01B 69/007 |
| | | | | 717/106 |
| 2012/0174445 A1* | 7/2012 | Jones | ............... | G01S 19/53 |
| | | | | 37/197 |
| 2014/0324291 A1* | 10/2014 | Jones | ............... | E02F 9/2054 |
| | | | | 701/41 |
| 2015/0361642 A1* | 12/2015 | Stratton | ............... | G06F 16/29 |
| | | | | 701/461 |
| 2016/0195557 A1* | 7/2016 | Schubert | ............... | B01L 3/502 |
| | | | | 436/69 |
| 2018/0266829 A1 | 9/2018 | Fritz et al. | | |
| 2019/0129435 A1* | 5/2019 | Madsen | ............... | G05D 1/0246 |
| 2020/0049514 A1* | 2/2020 | Grandl | ............... | G01C 21/3841 |

FOREIGN PATENT DOCUMENTS

| | | |
|---|---|---|
| DE | 102015208590 A1 | 11/2016 |
| DE | 102017204239 A1 | 9/2018 |
| GB | 2563262 A | 12/2018 |
| WO | 2016195557 A1 | 12/2016 |

\* cited by examiner

METHOD FOR CONTROLLING A UTILITY VEHICLE

CROSS REFERENCE TO RELATED APPLICATIONS

This application is a U.S. National Phase application under 35 U.S.C. § 371 of International Application No. PCT/EP2020/050788, filed on Jan. 14, 2020, and claims benefit to German Patent Application No. DE 10 2019 202 182.4, filed on Feb. 19, 2019. The International Application was published in German on Aug. 27, 2020 as WO 2020/169272 A1 under PCT Article 21(2).

BACKGROUND

The present disclosure relates to a method for controlling a utility vehicle, in particular an agricultural vehicle or a construction machine.

SUMMARY

In an embodiment, the present disclosure provides a method for controlling a utility vehicle. The method includes detecting, via a sensor, an elevation profile of a region located in front of the utility vehicle in the direction of travel and initializing a grid comprising a plurality of grid cells. The grid extends at least in a longitudinal direction and in a vertical direction of the region. The method further includes assigning the detected elevation profile to associated grid cells by writing elevation profile data into grid cells and controlling the vehicle based on the elevation profile data.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
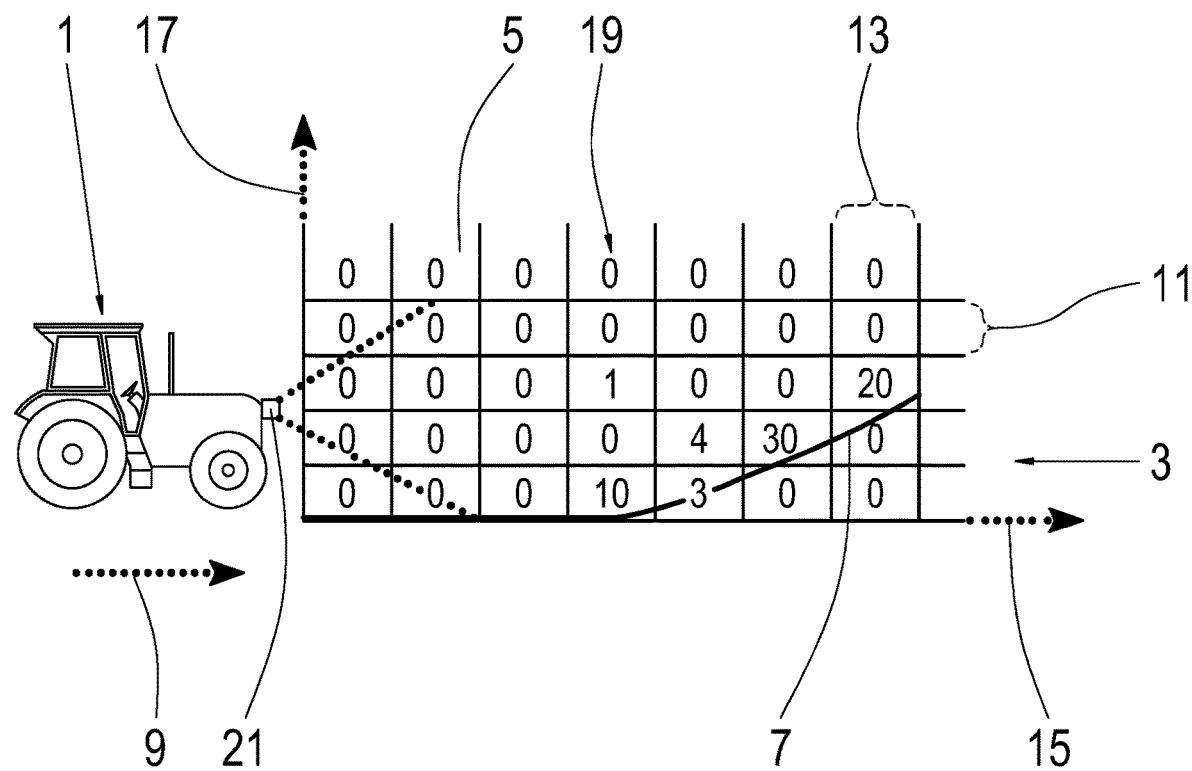
FIG. 1 is a schematic diagram for explaining an embodiment.

The present disclosure describes a shift strategy for a transmission of a utility vehicle, via which a changing elevation profile can be reacted to.

Accordingly, a method is provided for controlling a utility vehicle The method includes detecting an elevation profile of a region located in front of the vehicle in the direction of travel by means of a sensor; initializing a grid having a plurality of grid cells, wherein the grid extends at least in a longitudinal direction and in a vertical direction of the region; assigning the detected elevation profile to associated grid cells by writing elevation profile data into grid cells; controlling the vehicle on the basis of elevation profile data, in particular changing or preventing a change in a rotational speed of an engine of the vehicle in order for the vehicle to travel over the detected elevation profile.

Agricultural vehicles are, for example, tractors or harvesting vehicles.

Construction machines are, for example, excavators, wheel loaders, crawlers, and the like.

In this patent application, utility vehicles are understood to mean agricultural vehicles, construction machines, snow groomers, and the like. Hereinafter, industrial vehicles are also referred to as vehicle for short.

An elevation profile is understood to mean a linear, vertical section through the terrain. It shows the height along the profile line as a diagram.

The change in a rotational speed can take place, for example, by a shift operation of a transmission or by the direct adjustment of a rotational speed. The prevention of a change in a rotational speed means, for example, a shift prevention by means of which a different gear of the transmission is prevented from being engaged.

In this patent application, the vertical direction is oriented in parallel to gravity and the longitudinal direction is oriented in parallel to the direction of travel of the vehicle.

In this patent application, the wording "assigning elevation profile data to a grid cell" or "writing elevation profile data to a grid cell" also comprises the further processing of the elevation profile data in a grid cell, for example the incrementing of existing elevation profile data in a grid cell by newly determined elevation profile data.

Radar (radio detection and ranging) is the designation for various detection and ranging methods and devices based on electromagnetic waves in the radio frequency range (radio waves). A radar device is a device that emits electromagnetic waves in a bundled manner, receives and evaluates echoes reflected by objects or terrain. Information about the objects or terrain can thus be obtained.

Lidar (light detection and ranging), also ladar (laser detection and ranging), is a method related to radar for optical distance and speed measurement and for remote measurement of atmospheric parameters. Laser beams are used instead of the radio waves as in radar.

An interface is a device between at least two functional units at which an exchange of logical variables, e.g., data, or physical variables, e.g., electrical signals, takes place, either only unidirectionally or bidirectionally. The exchange can take place analogously or digitally. The exchange can also take place in a wired or wireless manner.

The basic idea of the present disclosure is to detect an elevation profile lying in the direction of travel of a utility vehicle and to control the vehicle proactively on the basis of the detected elevation profile. In particular, it may be provided that a higher gear of a transmission is engaged on the basis of the detected elevation profile. Alternatively, it may be provided that a different gear of a transmission is engaged. Further alternatively, it may be provided that a specific rotational speed or a specific rotational speed range is defined.

The present disclosure provides for storing elevation profile data in a grid having a plurality of grid cells. The grid is at least two-dimensional and extends in a longitudinal direction and in a vertical direction with respect to the direction of movement of the vehicle. Accordingly, the grid forms, for example, a sectional plane extending in the direction of travel of the vehicle.

The sensor can be designed as a radar sensor, lidar sensor, optical sensor, and/or TOF sensor, provided that the assignment of elevation profile data to a grid cell is possible.

Thus, the shift strategy of a vehicle transmission can be improved since the foresight allows a proactive reaction to a changing elevation profile.

According to a preferred development, the elevation profile data are formed as binary numbers. Accordingly, a 1 is assigned to a grid cell or the cell is incremented by 1 if terrain is detected in the region of the cell. If no terrain is detected in the region of the grid cell, a 0 is assigned to the grid cell or the cell is incremented by 1.

According to a preferred development, the elevation profile of the region is detected at a time point T during the travel of the vehicle and is assigned to a grid cell of the grid associated with the region. Furthermore, the elevation profile of the region is detected at a time point T+1 during the travel of the vehicle and is assigned to an associated grid cell of the grid. Accordingly, the elevation profile data at time point T in the grid cells are not deleted or overwritten at a next time point T+1, but rather the elevation profile data in the grid cells are incremented at time point T+1 if terrain is detected for a grid cell at time point T+1.

It is thus possible to check at a later time point T+1 the detection of terrain in a grid cell at a time point T if the corresponding grid cell has not yet been traveled over by the vehicle at time point T+1. It is thus possible to recognize an erroneous detection of terrain.

Accordingly, it may also be provided that the value of a grid cell is a measure of the reliability of the detected elevation profile in the region of the grid cell. For example, it may be provided that the value of a grid cell corresponds to how often, i.e., at how many time points, terrain was detected in the corresponding grid cell. Incorrect shift operations of the transmission can thus be prevented or reduced.

According to a preferred development, grid cells located behind the vehicle are deleted. The memory required in a computing unit for the method can thus be reduced.

Accordingly, it may also be provided that the grid is shifted according to the vehicle's own speed, i.e., that grid cells at the left edge of the grid (in the case of a direction of travel to the right) are deleted according to the vehicle's own speed and that grid cells are added at the right edge of the grid according to the vehicle's own speed.

According to a preferred development, elevation profile data at time point T+1 are written into grid cells by adding the elevation profile data at the time point T+1 to the elevation profile data at the time point T. It can thus be provided that the value of a grid cell corresponds to how often, i.e., at how many time points, terrain was detected in the corresponding grid cell. This increases the reliability of terrain detection in a grid cell. Incorrect shift operations of the transmission can thus be prevented or reduced.

According to a preferred development, the grid maps exactly two dimensions (a longitudinal direction and a vertical direction) and the sensor detects two-dimensional data in particular. The computing effort of the method can thus be reduced in comparison to a three-dimensional grid and a three-dimensional sensor.

Alternatively, it may also be advantageous for a specific application to implement a three-dimensional grid and to process three-dimensional sensor data. A three-dimensional grid and three-dimensional sensor data are particularly advantageous in the detection of elevation profiles during or before cornering.

According to a preferred development, a number of time points at which elevation profile data are taken into account is dependent on a speed and/or on a control angle of the vehicle. For example, it may arise that values in grid cells lose their importance or have become insignificant due to a change in direction of the vehicle. Accordingly, it is advantageous to take into account a reduced number of time points at which elevation profile data are taken into account given large control angles or given control angles that exceed a specific threshold value.

According to a preferred development, the elevation profile of the region is detected by means of a regression analysis of the sensor data of the sensor. An elevation profile can thus be determined with low computing power.

According to a preferred development, the slope of a terrain is derived from a column-by-column difference in the number of grid cells having a value corresponding to the detection of terrain. For example, a column i of the grid may have four grid cells for which terrain was detected, and a column i−1 may have two grid cells for which terrain was detected. In this case, the number 2 resulting from the column-by-column difference of the i th and the i−1 th columns of the grid is a measure of the slope between the i−1 th and the i th grid cells.

The present disclosure further provides a driver assistance system for a utility vehicle, comprising a sensor for detecting an elevation profile, in particular a radar sensor and/or a lidar sensor, a computing unit configured to carry out the method as described above, and an interface which can be connected to a transmission of the utility vehicle.

The accompanying drawings are intended to provide further understanding of the embodiments. They illustrate embodiments and, in connection with the description, serve to explain principles and concepts. Other embodiments and many of the advantages mentioned will become apparent from the drawings. The elements of the drawings are not necessarily shown to scale relative to each other.

In the figures of the drawings, identical, functionally identical, and identically acting elements, features, and components are each provided with the same reference signs unless stated otherwise.

FIG. 1 shows a utility vehicle 1, namely a tractor, comprising a sensor 21, which moves forward with an intrinsic motion 9. The intrinsic motion 9 can be broken down into a component in the longitudinal direction 13 and into a component in the vertical direction 11.

An imaginary grid 3 with grid cells 5 is shown in front of the vehicle 1 in FIG. 1. The grid 3 is a two-dimensional grid and extends in a longitudinal direction 15 and in a vertical direction 17. The grid cells 5 have a predetermined length and a predetermined height. The method according to one embodiment provides for detecting, at each time step T, T+1, . . . whether terrain was detected in a grid cell 5. If terrain was detected for a grid cell 5, the value of the respective grid cell 5 is incremented by 1. If no terrain was detected for a grid cell 5, the value of the respective grid cell 5 remains unchanged. Accordingly, elevation profile data 19 at a time step T, T+1, . . . are formed as binary numbers, although integer numbers greater than 1 are also stored in the grid 3.

After the vehicle 1 has traveled the length or the height of a grid cell 5, the grid is shifted by a grid cell length or grid cell height counter to the direction of travel of the vehicle 1. Accordingly, grid cells directly in front of the vehicle 1 or below the vehicle 1 are deleted, and new grid cells 5 are added at opposite ends of the grid 3.

In FIG. 1, terrain was detected for a grid cell at 30 time points. Terrain was detected twenty times or ten times for other grid cells. Starting from this relatively large number of terrain perceptions for the respective grid cells 5, it can be assumed that the terrain detections are correct for said grid cells 5. In contrast, terrain was only detected at one time point for a further grid cell 5. Where terrain is detected for a grid cell only once, it can be assumed that it is an erroneous detection of terrain based on a sensor fault. In this regard, reference is also made to "ghost targets."

An elevation profile 7 is detected on the basis of these conclusions.

Figure 2:
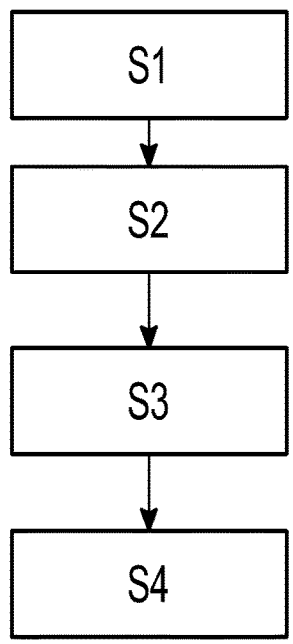
FIG. 2 is a schematic block diagram of an embodiment.

FIG. 2 shows a schematic block diagram of an embodiment. In step S1, an elevation profile 7 of a region located in front of the vehicle 1 in the direction of travel is detected by means of a sensor. In step S3, a grid 3 is initialized with a plurality of grid cells 5, wherein the grid 3 maps at least one longitudinal direction 15 and one vertical direction 17 of the region. In step S3, the detected elevation profile 7 is assigned to associated grid rows 5 by writing elevation profile data 19 into grid cells 5. In step S4, the vehicle 1 is controlled based on elevation profile data 19, in particular by changing or preventing a change in a rotational speed of an engine of the vehicle 1.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE CHARACTERS

1 Utility vehicle
3 Grid
5 Grid cell
7 Elevation profile
9 Intrinsic motion
11 Component in the vertical direction of the intrinsic motion
13 Component in the longitudinal direction of the intrinsic motion
15 Longitudinal direction
17 Vertical direction
19 Elevation profile data
21 Sensor
S1-S4 Method steps

The invention claimed is:

1. A method for controlling a utility vehicle, the method comprising:
 detecting, via a sensor, an elevation profile of a region located in front of the utility vehicle in the direction of travel;
 initializing a grid comprising a plurality of grid cells, wherein the grid extends at least in a longitudinal direction and in a vertical direction of the region;
 assigning the detected elevation profile to associated grid cells by writing elevation profile data into grid cells; and
 controlling the vehicle based on the elevation profile data.

2. The method according to claim 1, wherein the elevation profile data are formed as binary numbers.

3. The method according to claim 1, wherein the elevation profile of the region is detected at a time point T during travel of the vehicle and assigned to associated grid cells of the grid, and the elevation profile of the region is detected at a time point T+1 during the travel of the vehicle and assigned to associated grid cells of the grid.

4. The method according to claim 3, wherein the value of a grid cell is a measure of a reliability of the detected elevation profile in a vicinity of the grid cell.

5. The method for controlling a utility vehicle according to claim 3, further comprising deleting grid cells located behind the vehicle.

6. The method according to claim 1, wherein the elevation profile data at time point T+1 are written into grid cells by adding the elevation profile data at time point T+1 to the elevation profile data at time point T.

7. The method according to claim 1, wherein the grid maps precisely two dimensions and the sensor detects two-dimensional data.

8. The method according to claim 1, wherein a number of time points at which elevation profile data are taken into account is dependent on a speed of the vehicle.

9. The method according to claim 8, wherein a changed predetermined number of past detections of the elevation profile is taken into account relative to a speed and/or a control angle of the vehicle below a predetermined threshold value if the speed and/or the control angle of the vehicle exceeds the predetermined threshold value.

10. The method according to claim 1, wherein the elevation profile of the region is determined via a regression analysis of sensor data of the sensor.

11. The method according to claim 1, wherein a difference between a first and a second column of the grid of a number of grid cells comprising a value corresponding to a detection of terrain is a measure of a slope of an elevation profile between the first and the second column of the grid.

12. The method according to claim 1, wherein the controlling the vehicle based on the elevation profile data includes changing or preventing a change in a rotational speed of an engine of the vehicle in order for the vehicle to travel over the detected elevation profile.

13. The method according to claim 1, wherein a number of time points at which elevation profile data are taken into account is dependent on a control angle of the vehicle.

14. The method according to claim 8, wherein the number of time points at which elevation profile data are taken into account is also dependent on a control angle of the vehicle.

15. The method according to claim 1, further comprising predicting a time at which the vehicle will encounter an elevation change based on the elevation profile data,
 wherein controlling the vehicle based on the elevation profile data includes changing a gear of a transmission of the vehicle before the time at which the vehicle will encounter the elevation change.

16. The method according to claim 1, further comprising predicting a time at which the vehicle will encounter an elevation change based on the elevation profile data, wherein controlling the vehicle based on the elevation profile data includes setting a rotational speed or a rotational speed range for a transmission of the vehicle based on the predicted time at which the vehicle will encounter the elevation change.

17. The method according to claim 3, further comprising assigning a reliability value to each grid cell, the reliability value of each grid cell being based on a number of times elevation profile data has been written into a respective grid cell.

18. A driver assistance system for a utility vehicle, comprising:
   a sensor configured to detect an elevation profile,
   processing circuitry configured to carry out a method according to claim 1, and
   an interface configured to connect to a transmission of the utility vehicle.

19. The driver assistance system according to claim 18, wherein the sensor is a radar sensor and/or a lidar sensor.

\* \* \* \* \*